W. H. CABE.
LUBRICATING DEVICE FOR CABLES.
APPLICATION FILED APR. 15, 1916.
1,194,598.
Patented Aug. 15, 1916.
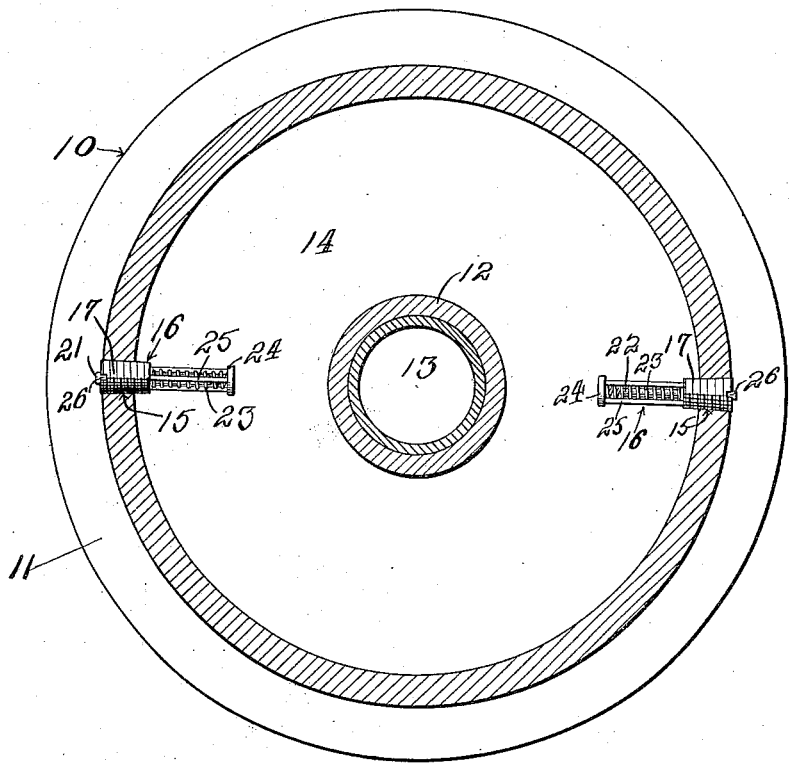
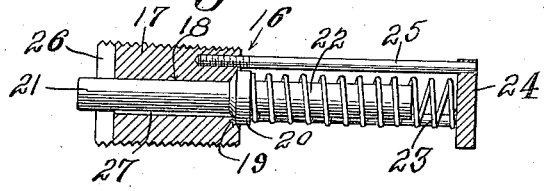
WITNESSES
Roland T. Williams.
INVENTOR
William H. Cabe
BY
ATTORNEY

UNITED STATES PATENT OFFICE.

WILLIAM H. CABE, OF HAMILTON, OHIO.

LUBRICATING DEVICE FOR CABLES.

1,194,598.  Specification of Letters Patent.  Patented Aug. 15, 1916.

Application filed April 15, 1916. Serial No. 91,399.

*To all whom it may concern:*

Be it known that I, WILLIAM H. CABE, a citizen of the United States, residing at Hamilton, in the county of Butler and State of Ohio, have invented certain new and useful Improvements in Lubricating Devices for Cables, of which the following is a specification.

This invention relates to a lubricating device and is designed to lubricate the peripheral grooves in sheaves about which wire cables pass, and has for its object to provide an automatic lubricator operated by the cable to open said lubricator during a portion of the revolution of a sheave and permit a lubricating fluid contained within said sheave to flow outwardly upon the cable and keep the same oiled to prevent rust and thereby preserve the cable.

Cables employed with derricks, dredging machines and the like are exposed at all times to the weather and to moisture and therefore tend to corrode very quickly, and to preserve the same the present device has been devised for applying a small quantity of the lubricating material or oil to the cable at each revolution of the sheave, which oil will gradually cover the cable during the operation of the machine and thereby form a shield to protect it from water.

In the accompanying drawing, Figure 1 is a sectional view of a sheave showing the lubricating attachment applied thereto, and, Fig. 2 is an enlarged sectional view of the lubricator.

Referring to the drawings by numerals, 10 indicates an ordinary metal sheave having a groove 11 in its periphery about which passes a cable usually formed of wire, said sheave having a hub portion 12 with an opening 13 therein for a shaft about which it turns or to which it is keyed when rotating with said shaft. Between the hub 12 and the bottom of the peripheral groove 11 within the sheave is a chamber or receptacle 14 of annular shape and occupying substantially the entire body of the sheave, the wall between the groove 11 and the chamber or receptacle 14 being relatively thin as also is the wall between the outer surface of the hub 12 and opening 13 through which the shaft passes.

One or more threaded openings 15 are formed through the periphery of the sheave at the base of the groove 11 into the chamber 14 and screwed into said openings are lubricators 16. Preferably only two of these lubricators are used placed diametrically opposite one another and this number are shown in the drawing.

Each lubricator comprises a threaded plug 17 that screws into an opening 15 and exteriorly is substantially flush with the bottom of the groove 11 of the sheave but projects a short distance into the chamber 14. Through the plug 17 in a longitudinal direction is formed a bore 18, the inner end of which is shaped to form a valve seat 19 for a valve 20, the stem 21 of which projects from one end of said valve through the bore 18 and a short distance into the groove 11 of the sheave. A stem 22 projects from the other side of said valve into the chamber 14 and is surrounded by a spiral spring 23 that bears at one end against the valve and at its other end against the plate 24 that is held in spaced relation and parallel with the face of the inner end of the plug 17 by a plurality of small rods 25 fastened to said plate and screwed into the plug 17.

The plate 24 is sufficiently small to pass into the chamber 14 through the opening 15 so that in assembling the lubricator it is only necessary to introduce the plate 24 and the parts therebetween and the plug 17 into the hole 15 and screw the plug in place which will be reached as soon as the outer end of the plug is flush with the bottom of the groove 11. A notch 26 is shown as formed in the outer end of the plug 17 to receive a tool for screwing and unscrewing said plug.

When the lubricator is in such position that a cable is out of contact therewith, the valve will be held by the spring 23 closed against the seat 19 as shown in Fig. 2 but when during the rotation of the sheave the lubricator 15 is brought into position for the cable to bear on the outer end of the stem 21, the valve 20 is depressed by the cable and unseated, permitting the oil in the sheave to pass between the valve and its seat and through a groove or enlargement 27 in the bore 18 to the outer face of the sheave or base of the groove 11 therein. As long as the cable presses against the valve stem 21 the valve remains open or in position to permit oil passing from the chamber 14 but as soon as the pressure of the cable is removed from the valve stem the spring 23 reacts against the valve and closes it.

This device may be used on pulleys and wheels of all kinds about which cables pass and which it is found desirable to keep covered with oil for preservation against deterioration by moisture or weather, and being simple, cheaply made and readily applied their use will be found very economical by adding to the longevity of cables.

I claim:

1. A lubricator for use with sheaves comprising a body portion adapted to be attached to said sheave and having an opening therethrough adapted to communicate at one end with an oil reservoir, an inwardly opening valve normally closing said opening and having a stem projecting beyond said body and adapted to be moved to open said valve by a cable and permit the escape of oil through said bore.

2. A lubricator for the peripheral faces of sheaves comprising an oil receptacle within the sheave, a plug having an opening therethrough secured to said sheave with one end flush with the groove therein and the other end opening into said oil receptacle, a valve adapted to close said opening to prevent the escape of oil therethrough, a spring for holding said valve closed, and a valve stem projecting through said opening into the groove in the sheave in position to be actuated by the cable for opening the valve and permitting the escape of oil through said opening in the plug.

3. A lubricator for the peripheral surface of a sheave, comprising a threaded plug having a longitudinal bore therethrough with a valve seat at one end, a valve fitted to said seat and having a stem projecting loosely through said bore and a short distance beyond the same, a spiral spring tending to close the valve upon its seat and a bearing plate for said spring, supported from said plug.

4. Means for lubricating or oiling cables, comprising a sheave for said cable having an oil receptacle therein, a lubricating device connected to said sheave and communicating with said oil receptacle and opening into the groove of said sheave, and a valve for normally closing the outlet through said lubricating device adapted to be opened by a cable passing about the sheave.

5. Means for lubricating or oiling cables, comprising a hollow sheave forming an oil receptacle and a lubricating device flush with the peripheral surface of said sheave and extending into said oil receptacle, said lubricating device having a passageway therethrough for oil and having a valve with a stem extending through said passageway and beyond the same in position to be actuated by a cable passing around said sheave to open said valve and permit the escape of oil.

6. A lubricating device for the periphery of a sheave comprising a threaded plug having a longitudinal opening therethrough and a valve seat on its inner end, a valve adapted to close against said seat having a stem projecting loosely through said opening beyond said plug, a guide stem on the other side of said valve in line with the valve stem, an expansible spring surrounding said guide stem and bearing against said valve to hold the same closed against its seat, a bearing plate spaced from said plug upon which the opposite end of said spring rests, and connecting rods between said plate and said plug.

In testimony whereof I affix my signature in presence of two witnesses.

WILLIAM H. CABE.

Witnesses:
C. D. AINGER,
M. NUDDLEMAN.

Copies of this patent may be obtained for five cents each, by addressing the "Commissioner of Patents, Washington, D. C."